No. 883,346. PATENTED MAR. 31, 1908.
P. RABBIDGE.
INDUCTOR ELECTRIC GENERATOR.
APPLICATION FILED OCT. 31, 1906.
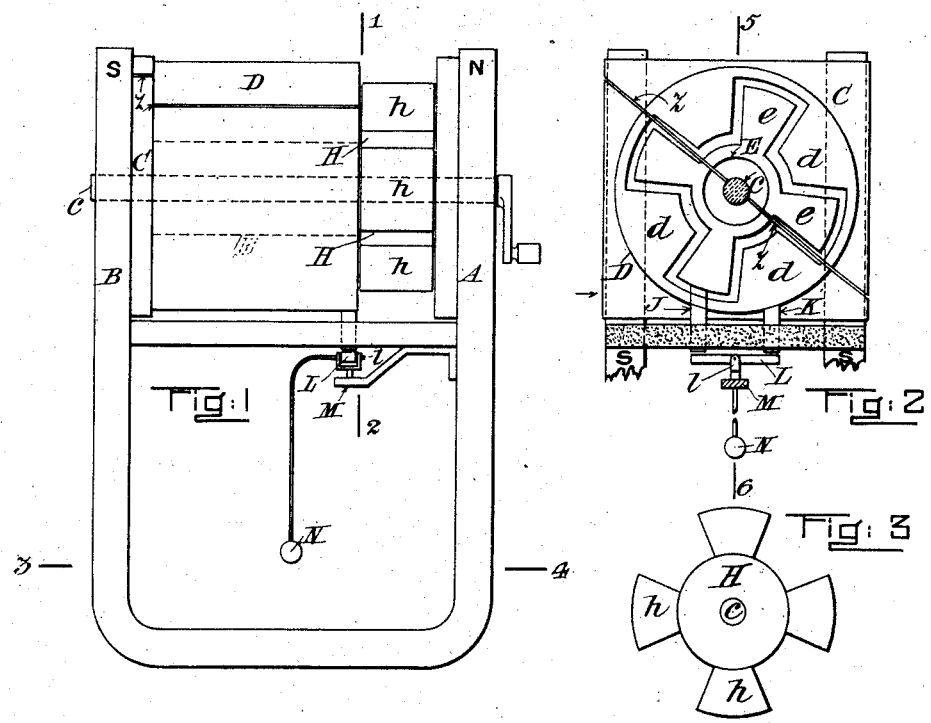
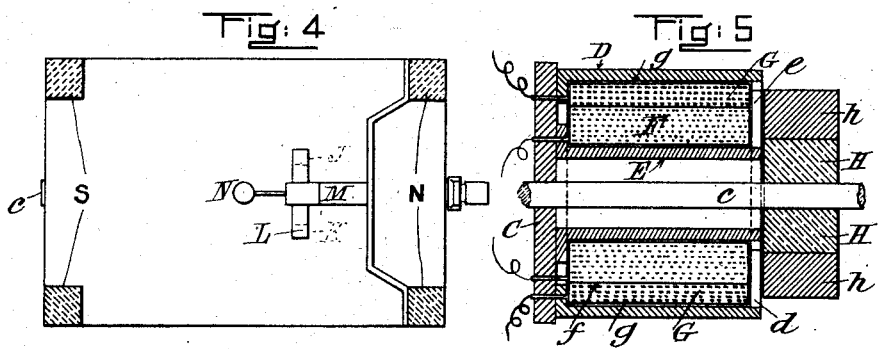
WITNESSES
W. P. Burke
H. N. Sierichs
INVENTOR
Parnell Rabbidge
BY
Richardson
ATTYS.

UNITED STATES PATENT OFFICE.

PARNELL RABBIDGE, OF NEUTRAL BAY, NEAR SYDNEY, NEW SOUTH WALES, AUSTRALIA.

INDUCTOR ELECTRIC GENERATOR.

No. 883,346.  Specification of Letters Patent.  Patented March 31, 1908.

Application filed October 31, 1906. Serial No. 341,411.

*To all whom it may concern:*

Be it known that I, PARNELL RABBIDGE, a subject of the King of Great Britain and Ireland, and resident of Water's Road, Neutral Bay, near Sydney, New South Wales, Australia, have invented new and useful Improvements in an Inductor Electric Generator, of which the following is a specification.

This invention relates to improvements in the construction of that type of electric generator known as the inductor generator, and its object is to simplify the construction of such an apparatus by using one stationary coil. By winding another coil of wire around the first coil, the second coil will act as a primary to inductively connect the outer circuit with it. In such a case the whole might be used as an induction coil, or transformer, of a telephone or telegraph circuit. If an alternating current be conducted through the line coil, the latter will act as a bell coil to vibrate an armature similar to that usually employed with a magneto bell, when an alternating current is passed through it.

In giving effect to the invention a base plate of soft iron is firmly secured to one of the poles of the field magnet, and to this base plate two concentric iron cylinders, are firmly attached. The base plate and cylinders are divided diametrically into two halves, for the purpose—(a) of permitting the coils to be inserted with facility, and (b) for preventing eddy currents from circulating round the cylinders, and thereby heating them.

Projecting inwards from the extreme end of the internal periphery of the larger cylinder are a number of radial projections, and projecting outwards from the extreme end of the external periphery of the smaller cylinder or core are a corresponding equal number of radial projections which alternate with the other projections. Around the inner cylinder or core (between the core and the cylindrical casing) is wound a coil of wire insulated from its surroundings, and, when used as a telephone instrument, around the peripheral insulation is wound a second coil of coarser wire, the two coils reposing within the annular space between the two cylinders, or circles of projections.

When applied to a telephone system, the inner coil of fine wire is connected to line at one end and to earth or return at the other end, and the outer coil of coarser wire is connected to the telephone or telegraph circuit. When applied to generating alternating currents for lighting and similar purposes, the annular space, between the cylinders, or the circles of projections, will contain only one coil of suitable sized wire, which will be connected direct to the work in the usual way, and the field magnet will also be electrically excited.

On the same axis as the cylinders, or circles of projections, and revolving before the external faces of the projections is an inductor, consisting of a brass hub with iron projections, such projections being half the total number of the projections from the pole or poles of the field magnet. This inductor will be rotated by some external and independent power.

The base plate may be dispensed with, and the cylinders, or circles of projections, may be secured direct to one or both poles of the field magnet, the base plate being merely a convenient mode of attaching the cylinders or projections to the pole.

In the accompanying drawings:—Figure 1 is a side elevation of the apparatus. Fig. 2 is a transverse vertical section of the same, taken on the line 1—2. Fig. 3 is a front elevation of the inductor. Fig. 4 is an underneath plan of Fig. 1, partly in section, taken on the line 3—4. Fig. 5 is a longitudinal vertical section of the coils taken on the line 5—6 of Fig. 2.

A is the N pole, and B the S pole of the field magnet; C the base plate secured to the S pole; D the outer iron cylinder; E the inner iron cylinder concentric with D; $d, d,$ iron projections inwards from the end of the cylinder (D); $e, e,$ iron projections outwards from the end of the cylinder (E). F, the main coil that is wound around E, and which may be used for either purpose. $f$, the insulation around F; G, the second coil wound around the peripheral part of the insulation ($f$) when used for telephones; $g$ is the insulation about G; H is the brass hub of the inductor, which rotates upon the axis $c;$ $h, h,$ are iron projections from the hub H, and constitute the inductors. The base-plate (C) and the two cylinders (D and E) are made in two halves (as shown by the diametric line Z) for the purpose—(a) of inserting the coils (F, G) with facility; and (b) for preventing eddy currents from circulating round the cylinders (D, E), and thereby heating them.

The inductor, when rotated, will conduct the magnetic flux alternately from the N pole—(a) through the projections (d) and the outside cylinder (D), to the S pole, and (b) through the projections (e) and the inside cylinder (E) to the S pole. This will have the same effect as though the flux were reversed inside the coils only.

When the apparatus is used as a telephone instrument, one iron pole (J) is connected to a projection (e), and another pole (K) is connected to a projection (d). Below these poles is a vibrating armature (L) pivoted at $l$ to an iron support (M) connected to the N pole of the field magnet. This combination will cause the tongue or hammer (N) of a bell to vibrate and ring the bell.

Having now described my invention, what I claim as new and desire to secure by Letters Patent is:—

A horse shoe field magnet, a core, and a cylindrical casing concentric therewith, both attached to one of the poles of the field magnet, a coil or coils wound upon the core between the core and the casing, projections, at regular intervals, from the edge of the core, and from the edge of the casing, alternating with one another, and an inductor adapted to rotate between the projections and the other pole of the field magnet, for the purpose of closing the magnetic circuit alternately inside and outside the coil or coils, as specified.

In testimony whereof I have signed my name to this specification in the presence of two subscribing witnesses.

PARNELL RABBIDGE.

Witnesses:
  ALBERT MASSEY,
  VINCENT NEWTON.